United States Patent
Chen

(10) Patent No.: US 6,866,386 B1
(45) Date of Patent: *Mar. 15, 2005

(54) COMBINATION OF A PLASTIC FRAME AND A LENS

(76) Inventor: Joy Chen, No. 24, Lane 420, Sec. 1, Chien Kang Rd., Tainan City (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/744,472

(22) Filed: Dec. 22, 2003

(51) Int. Cl.7 .................................................. G02C 1/04
(52) U.S. Cl. ....................................... 351/103; 351/106
(58) Field of Search ...................... 351/41, 44, 103–109

(56) References Cited

U.S. PATENT DOCUMENTS 6,561,647 B1 * 5/2003 Chen ........................... 351/103
6,764,175 B1 * 7/2004 Chen ............................ 351/47

* cited by examiner

Primary Examiner—Huy Mai
(74) Attorney, Agent, or Firm—Charles E. Baxley

(57) ABSTRACT

A combination of a plastic frame and a lens is provided. The plastic frame has no annular portion and includes a bridge in an intermediate portion thereof. A hole is defined in the bridge. A first magnetic member is securely mounted in the hole of the bridge. The bridge further includes a recessed portion. The lens includes an engaging portion in an intermediate portion thereof. The engaging portion of the lens is securely engaged in the recessed portion of the bridge. The engaging portion of the lens further includes a hole defined therein. A second magnetic member is securely mounted in the hole of the engaging portion of the lens. The second magnetic member and the first magnetic member are arranged to attract each other.

1 Claim, 3 Drawing Sheets

COMBINATION OF A PLASTIC FRAME AND A LENS

BACKGROUND OF THE INVENTION

1. Field of the Invention

The present invention relates to a combination of a plastic frame and a lens, allowing easy assembly and providing a stable, integrated structure for a pair of glasses or goggles.

2. Description of the Related Art

A typical pair of glasses or goggles includes a frame with two annular portions for respectively receiving two lenses. The ring portions result in an increase in the overall weight of the pair of glasses or goggles. Another typical pair of glasses or goggles includes a frame with two non-annular portions, and a lens is attached to the frame by magnetic attraction. However, the engaging effect between the frame and the lens is not reliable such that the lens is apt to disengage from the frame.

SUMMARY OF THE INVENTION

In accordance with an aspect of the invention, a combination of a plastic frame and a lens is provided. The plastic frame has no annular portion and includes a bridge in an intermediate portion thereof. A hole is defined in the bridge. A first magnetic member is securely mounted in the hole of the bridge. The bridge further includes a recessed portion. The lens includes an engaging portion in an intermediate portion thereof. The engaging portion of the lens is securely engaged in the recessed portion of the bridge. The engaging portion of the lens further includes a hole defined therein. A second magnetic member is securely mounted in the hole of the engaging portion of the lens. The second magnetic member and the first magnetic member are arranged to attract each other. Thus, the combination of a plastic frame and a lens in accordance with the present invention allows easy assembly and provides a stable, integrated structure for a pair of glasses or goggles.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
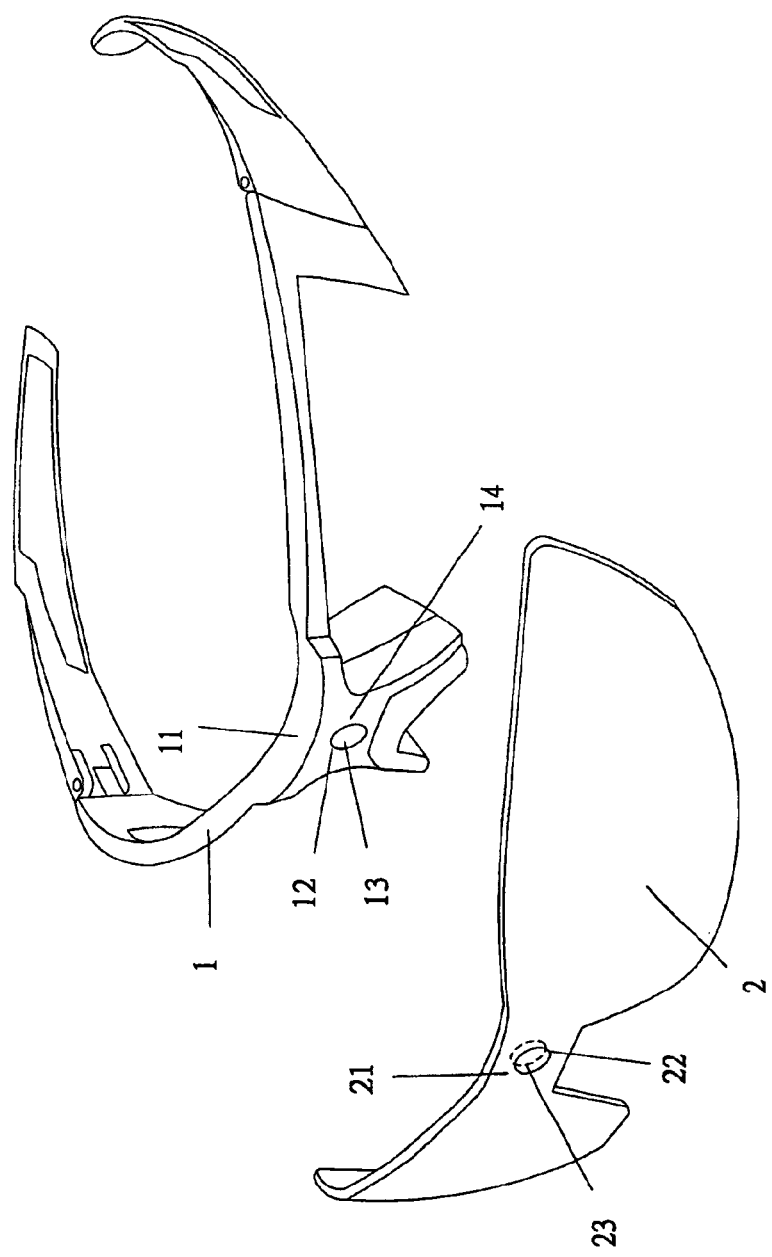
FIG. 1 is an exploded perspective view of a combination of a plastic frame and a lens in accordance with the present invention.
Figure 2:
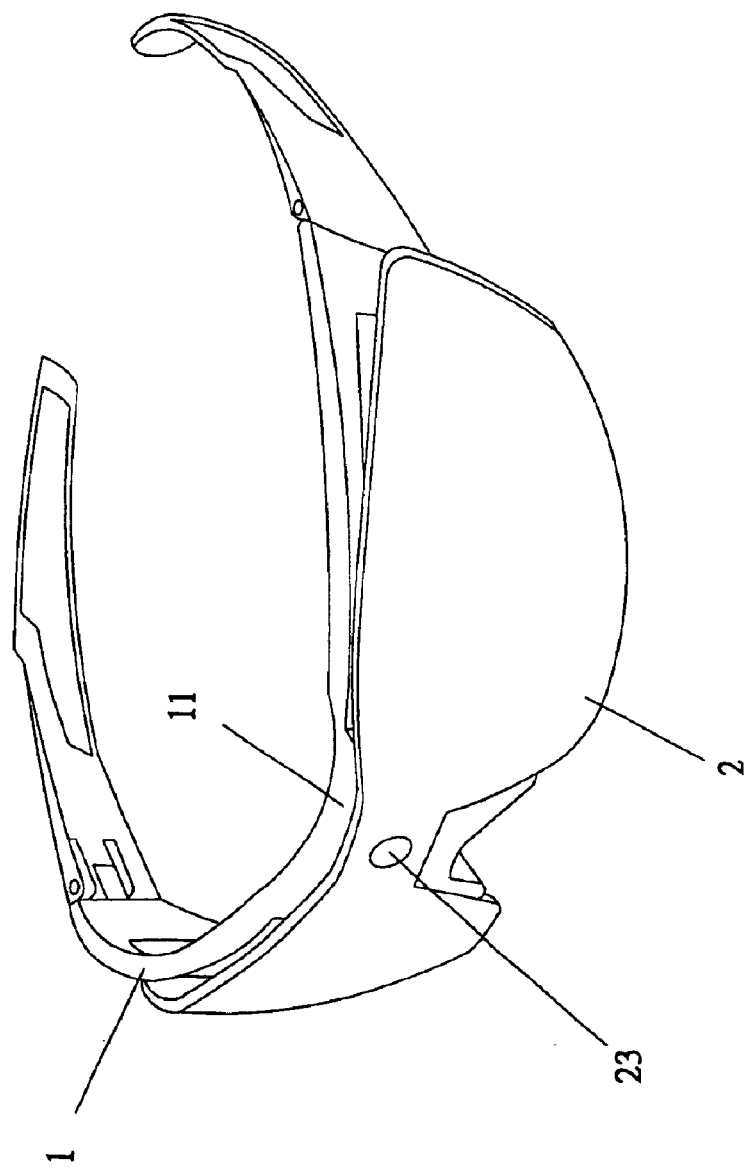
FIG. 2 is a perspective view of the combination of a plastic frame and a lens in accordance with the present invention.

Referring to FIGS. 1 and 2, a combination of a plastic frame and a lens in accordance with the present invention generally comprises a plastic frame 1 and a lens 2. The plastic frame 1 has no annular portion and includes a bridge 11 in an intermediate portion thereof. A hole 12 is defined in the bridge 11, and a first magnetic member 13 is securely mounted in the hole 12 of the bridge 11. The bridge 11 further includes a recessed portion 14.

The lens 2 includes an engaging portion 21 in an intermediate portion thereof. The engaging portion 21 of the lens 2 is securely engaged in the recessed portion 14 of the bridge 11. The engaging portion 21 of the lens 2 further includes a hole 22 defined therein. A second magnetic member 23 is securely mounted in the hole 22 of the engaging portion 21 of the lens 2. The second magnetic member 23 and the first magnetic member 13 are arranged to attract each other.

Figure 3:
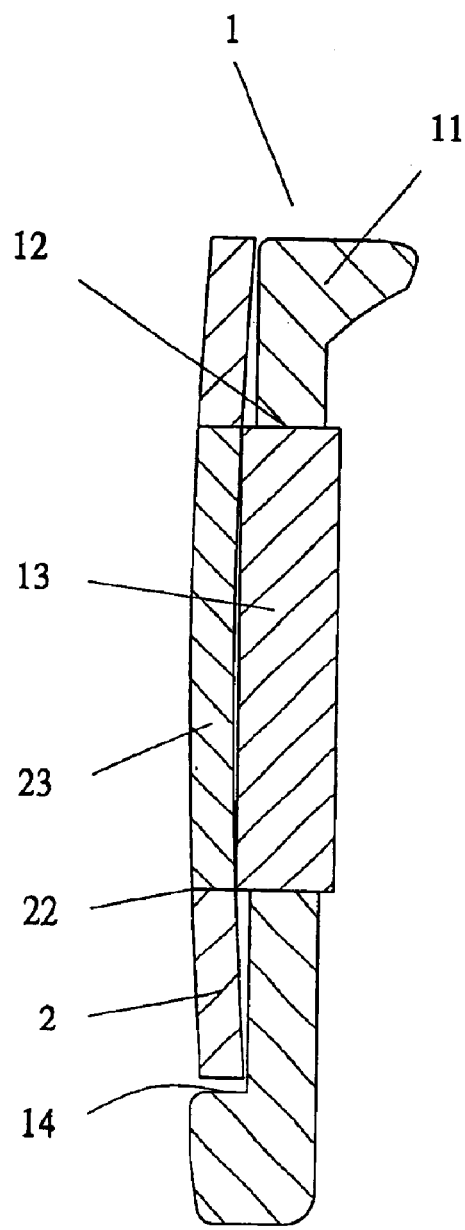
FIG. 3 is a sectional view of the combination of a plastic frame and a lens in accordance with the present invention

Referring to FIGS. 2 and 3, the engaging portion 21 of the lens 2 is securely engaged in the recessed portion 14 of the bridge 11, and the first magnetic member 13 and the second magnetic member 23 attract each other, thereby providing a reliable engaging effect between the lens 2 and the plastic frame 1. The plastic frame 1 without annular portion has a low weight. Thus, the combination of a plastic frame and a lens in accordance with the present invention allows easy assembly and provides a stable, integrated structure for a pair of glasses or goggles.

Although the invention has been explained in relation to its preferred embodiment, it is to be understood that many other possible modifications and variations can be made without departing from the scope of the invention as hereinafter claimed.

What is claimed is:

1. A combination of a plastic frame and a lens, comprising:

a plastic frame without annular portion, the plastic frame including a bridge in an intermediate portion thereof, a hole being defined in the bridge, a first magnetic member being securely mounted in the hole of the bridge, the bridge further including a recessed portion; and a lens including an engaging portion in an intermediate portion thereof, the engaging portion of the lens being securely engaged in the recessed portion of the bridge, the engaging portion of the lens further including a hole defined therein, a second magnetic member being securely mounted in the hole of the engaging portion of the lens, the second magnetic member and the first magnetic member being arranged to attract each other.

* * * * *